United States Patent
Gao

(10) Patent No.: US 10,893,333 B2
(45) Date of Patent: Jan. 12, 2021

(54) VIDEO PLAYING METHOD, DEVICE AND STORAGE

(71) Applicant: Tencent Technology (Shenzhen) Company Limited, Shenzhen (CN)

(72) Inventor: Guangyao Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/365,474

(22) Filed: Mar. 26, 2019

(65) Prior Publication Data

US 2019/0222898 A1 Jul. 18, 2019

Related U.S. Application Data

(63) Continuation of application No. PCT/CN2017/115851, filed on Dec. 13, 2017.

(30) Foreign Application Priority Data

Apr. 19, 2017 (CN) .......................... 2017 1 0258332

(51) Int. Cl.
*H04N 21/466* (2011.01)
*H04N 21/462* (2011.01)
(Continued)

(52) U.S. Cl.
CPC ..... *H04N 21/4668* (2013.01); *H04N 21/2187* (2013.01); *H04N 21/4316* (2013.01);
(Continued)

(58) Field of Classification Search
CPC ........... H04N 21/4668; H04N 21/2187; H04N 21/4316; H04N 21/440236;
(Continued)

(56) References Cited

U.S. PATENT DOCUMENTS

2004/0201608 A1* 10/2004 Ma .................... H04N 21/4438
715/719
2010/0115554 A1* 5/2010 Drouet ............. H04N 21/44222
725/41
(Continued)

FOREIGN PATENT DOCUMENTS

CN 1710952 A 12/2005
CN 1968366 A 5/2007
(Continued)

OTHER PUBLICATIONS

Tencent Technology, ISR, PCT/CN2017115851, dated Feb. 22, 2018, 2 pgs.
(Continued)

*Primary Examiner* — Alexander Gee
(74) *Attorney, Agent, or Firm* — Morgan, Lewis & Bockius LLP

(57) ABSTRACT

Embodiments of the present disclosure disclose a video playing method performed at a client. The method includes: sending, by the client, first indication information to a server, the first indication information being used to instruct to play, in video mode, a first target video to be live broadcast, and instruct to play, in text mode, a second target video to be live broadcast; receiving, by the client, first live-broadcast data sent by the server, the first live-broadcast data including video data of the first target video and text data of the second target video; and simultaneously playing, by the client, the video data of the first target video and the text data of the second target video on a second live-broadcast page. The embodiments of the present disclosure resolve a problem in the related technology that a function of playing live-broadcast videos on a same live-broadcast page is monotonous.

20 Claims, 8 Drawing Sheets

(51) Int. Cl.
  *H04N 21/4402* (2011.01)
  *H04N 21/472* (2011.01)
  *H04N 21/6587* (2011.01)
  *H04N 21/431* (2011.01)
  *H04N 21/2187* (2011.01)
  *H04N 21/239* (2011.01)
  *H04N 21/485* (2011.01)
  *H04N 21/81* (2011.01)

(52) U.S. Cl.
  CPC . *H04N 21/440236* (2013.01); *H04N 21/4622* (2013.01); *H04N 21/47202* (2013.01); *H04N 21/6587* (2013.01); *H04N 21/8133* (2013.01)

(58) Field of Classification Search
  CPC ......... H04N 21/4622; H04N 21/47202; H04N 21/6587; H04N 21/8133; H04N 21/4312
  See application file for complete search history.

(56) References Cited

U.S. PATENT DOCUMENTS

| | | | | |
|---|---|---|---|---|
| 2011/0191810 | A1* | 8/2011 | Thomas | H04N 7/106 725/81 |
| 2015/0026583 | A1* | 1/2015 | Anguiano | H04N 21/2407 715/738 |
| 2016/0170709 | A1* | 6/2016 | Jang | H04N 21/4396 715/727 |
| 2017/0195713 | A1* | 7/2017 | Yang | H04N 21/251 |
| 2019/0149731 | A1* | 5/2019 | Blazer | H04N 5/232935 348/39 |

FOREIGN PATENT DOCUMENTS

| | | |
|---|---|---|
| CN | 201001165 Y | 1/2008 |
| CN | 101472103 A | 7/2009 |
| CN | 102845056 A | 12/2012 |
| CN | 104954874 A | 9/2015 |
| CN | 105245909 A | 1/2016 |
| CN | 106407276 A | 2/2017 |
| CN | 106506335 A | 3/2017 |

OTHER PUBLICATIONS

Tencent Technology, Written Opinion, PCT/CN2017/115851, dated Feb. 22, 2018, 4 pgs.
Tencent Technology, IPRP, PCT/CN2017/115851, dated Oct. 22, 2019, 5 pgs.

\* cited by examiner

VIDEO PLAYING METHOD, DEVICE AND STORAGE

CROSS-REFERENCE TO RELATED APPLICATIONS

This application is a continuation application of PCT/CN2017/115851, entitled "VIDEO PLAYBACK METHOD AND DEVICE, AND STORAGE MEDIUM" filed on Dec. 13, 2017, which claims priority to Chinese Patent Application No. 201710258332.3, filed with the Chinese Patent Office on Apr. 19, 2017 and entitled "VIDEO PLAYING METHOD AND APPARATUS", all of which are incorporated herein by reference in their entirety.

FIELD OF THE TECHNOLOGY

Embodiments of the present disclosure relate to the field of video playing, and specifically, to a video playing method and apparatus, and a storage medium.

BACKGROUND OF THE DISCLOSURE

Currently, during video live broadcast, generally a video client (Application, APP for short) can only monotonously perform live broadcast in a video playing mode or a text playing mode.

FIG. 1 is a flowchart of a video playing method in the related technology. As shown in FIG. 1, the video playing method includes the following steps: step S101', searching for a live-broadcast video by means of recommendation, searching, and the like; step S102', playing the live-broadcast video; and step S103', quitting playing of the live-broadcast video, and after quitting the live-broadcast video, re-searching for a live-broadcast video by means of recommendation, searching, and the like, to obtain a new live-broadcast video, then broadcast the new live-broadcast video, and finally switch the original live-broadcast video to the new live-broadcast video.

The foregoing original live-broadcast video and the new video cannot be simultaneously played on a same live-broadcast page, and a video live broadcast in a video playing mode and a video live broadcast in text mode cannot be simultaneously played on a same live-broadcast page either. A live broadcast switching operation is complex, and a requirement that a plurality of live-broadcast videos is simultaneously played by means of a simple switching operation cannot be met. As a result, a function of playing live-broadcast videos on a same live-broadcast page is monotonous.

For the foregoing problem in the related technology that the function of playing live-broadcast videos on a same live-broadcast page is monotonous, an effective solution is not yet provided to date.

SUMMARY

Embodiments of the present disclosure provide a video playing method and apparatus and a storage medium, at least to resolve a problem in the related technology that a function of playing live-broadcast videos on a same live-broadcast page is monotonous.

According to a first aspect of the embodiments of the present disclosure, a video playing method is performed at a client having one or more processors and memory storing a plurality of programs to be executed by the one or more processors, the method comprising: sending, by the client, first indication information to a server, the first indication information being used to instruct the server to play a first target video to be live broadcast in video mode and a second target video to be live broadcast in text mode simultaneously; receiving, by the client, first live-broadcast data sent by the server, the first live-broadcast data including video data of the first target video and text data of the second target video; and simultaneously playing, by the client, the video data of the first target video and the text data of the second target video on a second live-broadcast page.

According to a second aspect of the embodiments of the present disclosure, a client device (e.g., a terminal) is further provided. The terminal is configured to execute a plurality of computer-readable instructions to perform the aforementioned video playing method in the embodiments of the present disclosure.

According to a third aspect of the embodiments of the present disclosure, a non-transitory computer readable storage medium is further provided for storing a plurality of instructions in connection with a server having one or more processors. The plurality of instructions are used to perform the aforementioned video playing method in the embodiments of the present disclosure.

In the embodiments of the present disclosure, a client sends first indication information to a server, the first indication information being used to instruct to play, in video mode, a first target video to be live broadcast, and instruct to play, in text mode, a second target video to be live broadcast; the client receives first live-broadcast data sent by the server, the first live-broadcast data including video data of the first target video and text data of the second target video; and the client simultaneously plays the video data of the first target video and the text data of the second target video on a second live-broadcast page. The first indication information is sent to the server by using the client, the video data of the first target video and the text data of the second target video that are sent by the server according to the indication information are played on the second live-broadcast page of the client, so that the first target video and the second target video are simultaneously played, a technical effect that a function of playing live-broadcast videos on a same live-broadcast page is enriched is achieved, and a problem in the related technology that the function of playing live-broadcast videos on a same live-broadcast page is monotonous is further resolved.

BRIEF DESCRIPTION OF THE DRAWINGS

The accompanying drawings described herein are intended to provide a further understanding of the embodiments of the present disclosure and constitute a part of this application. The exemplary embodiments of the present disclosure and description thereof are intended to explain the present disclosure, and not to constitute an improper limitation on the present disclosure. In the figures.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that in the specification, claims, and accompanying drawings of the present disclosure, the terms "first", "second", "third", "fourth", and so on are intended to distinguish between similar objects but do not necessarily indicate a specific order or sequence. It should be understood that data used in this way is exchangeable in a proper case, so that the embodiments of the present disclosure described herein can be implemented in another order except those shown or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

According to an aspect of the embodiments of the present disclosure, an embodiment of a video playing method is provided.

Figure 1:
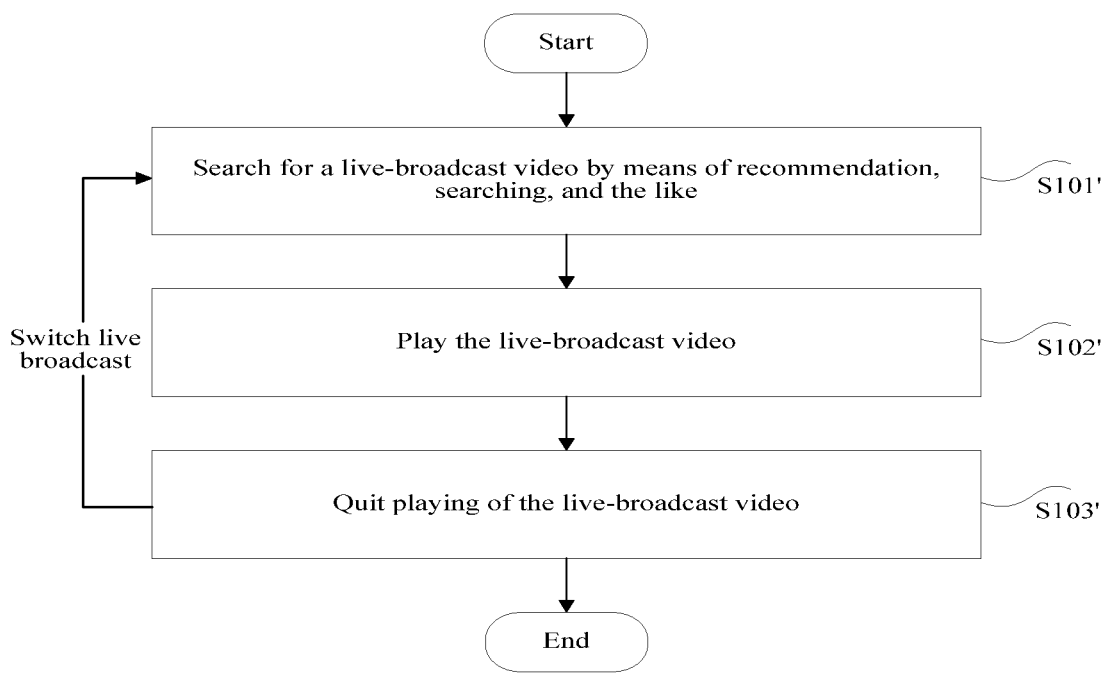
FIG. 1 is a flowchart of a video playing method in the related technology.
Figure 2:
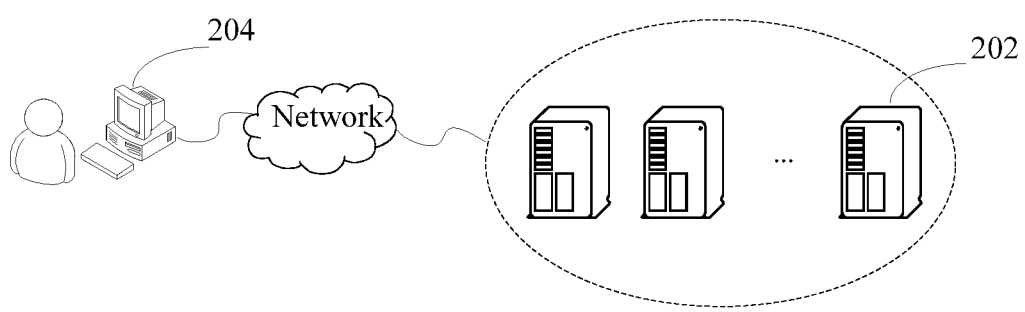
FIG. 2 is a schematic diagram of a hardware environment of a video playing method according to an embodiment of the present disclosure.

In some embodiments, in this embodiment, the video playing method may be applied to a hardware environment formed by a server 202 and a terminal 204 shown in FIG. 2. FIG. 2 is a schematic diagram of a hardware environment of a video playing method according to an embodiment of the present disclosure. As shown in FIG. 2, the server 202 is connected to the terminal 204 by using a network. The network includes but is not limited to: a wide area network, a metropolitan area network, or a local area network. The terminal 204 includes but is not limited to: a PC, a mobile phone, a tablet computer, and the like. The video playing method in this embodiment of the present disclosure may be performed by the server 202 or may be performed by the terminal 204, or may be performed together by the server 202 and the terminal 204. The video playing method performed by the terminal 204 in this embodiment of the present disclosure may alternatively be performed by a client installed on the terminal 204.

Figure 3:
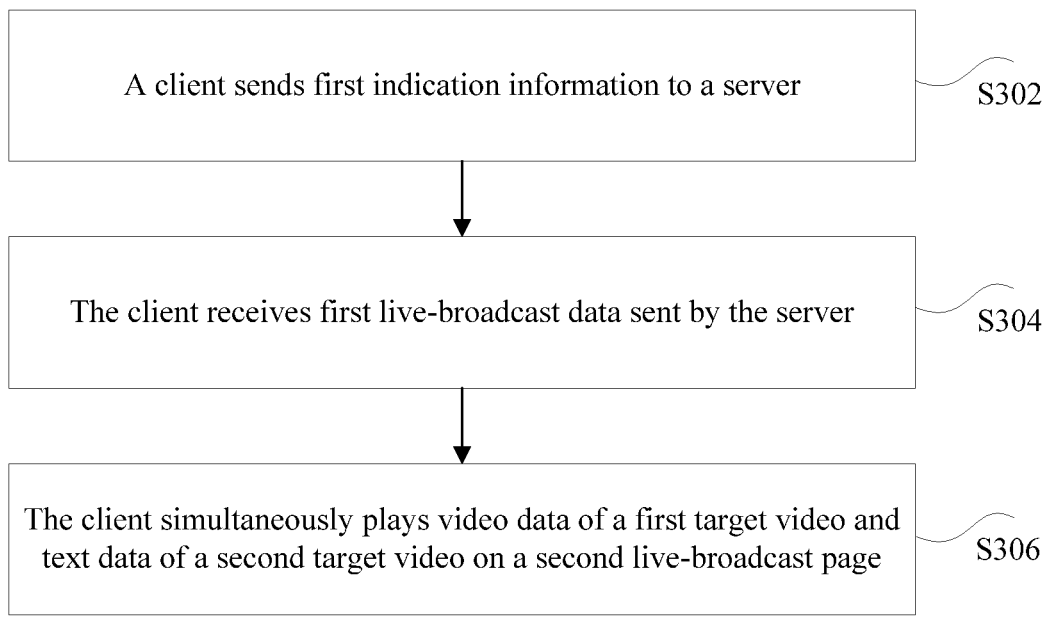
FIG. 3 is a flowchart of a video playing method according to an embodiment of the present disclosure.

FIG. 3 is a flowchart of a video playing method according to an embodiment of the present disclosure. As shown in FIG. 3, the method may include the following steps:

Step S302. A client sends first indication information to a server.

In the technical solution provided in step S302 in this application, the first indication information is used to instruct to play, in video mode, a first target video to be live broadcast, and instruct to play, in text mode, a second target video to be live broadcast. The client is a video client, and may be configured to live broadcast a video. The video is a video followed by a user, for example, a video about a National Basketball Association (NBA) competition. The video may be played in one or a combination of a plurality of modes, for example, played in video mode, played in text mode, played in a large window, played in a small window, played with audio, and played without audio. The larger window is a large playing window displayed on an interface of the client, and the small window is a small playing window displayed on the interface of the client. A playing mode determines a video viewing mode of the user.

The video in the embodiment includes a first target video and a second target video. The first target video is a video to be live broadcast in video mode. That is, a video image is displayed on a playing window and audio corresponding to the video image is played. The first target video is a primary scenario video for video live broadcast, and may be switched to another playing mode, for example, switched to a video to be live broadcast in text mode. In some embodiments, the first target video is a live-broadcast video that the user is most interest in. The second target video is a video to be live broadcast in text mode. That is, text content of the video to be live broadcast is displayed on the playing window. The second target video is a secondary scenario video for video live broadcast, and may be switched to another playing mode, for example, switched to a video to be live broadcast in video mode. In some embodiments, when the second target video is live broadcast in text mode, audio corresponding to the second target video is turned off. With the text content, the user can also understand information about the live-broadcast video. For example, the text content explains in detail the progress, condition, results, and the like of the live-broadcast video.

The server prestores a plurality of playing modes of a video and playing data corresponding to each playing mode. For example, the server stores video data and text data of the first target video, and stores video data and text data of the second target video. The client sends the first indication information to the server.

Step S304: The client receives first live-broadcast data sent by the server.

In the technical solution provided in step S304 in this application, the first live-broadcast data includes: video data of the first target video and text data of the second target video. After the client sends the first indication information to the server, the client receives the first live-broadcast data that is sent by the server according to the first indication information. The first live-broadcast data is comprehensive live-broadcast page data, and includes the video data of the first target video to be played and the text data of to-be-played text of the second target video.

In some embodiments, after the client sends the first indication information to the server, the server receives the first indication information, and may deliver, to the client, live broadcast information that is stored and that is used to indicate that the first indication information has been received. The first indication information instructs to play the first target video in video mode and play the second target video in text mode.

Step S306. The client simultaneously plays video data of a first target video and text data of a second target video on a second live-broadcast page.

In the technical solution provided in step S306 in this application, after receiving the first live-broadcast data sent by the server, the client plays the video data of the first target video on the second live-broadcast page, so that the first target video is played on the second live-broadcast page in video mode, and the text data of the second target video is simultaneously played on the second live-broadcast page, the second target video being played on the second live-broadcast page in text mode. In this way, a comprehensive live-broadcast interface scenario in which a plurality of live-broadcast videos is displayed on a same page is presented to the user, and a function of playing live-broadcast videos on a same live-broadcast page is enriched.

In an optional implementation, in step S302, before the client sends the first indication information to the server, the client enters a first live-broadcast page; the client receives a viewing instruction. Step S302 of sending, by a client, first indication information to a server includes: sending, by the client, the first indication information corresponding to the viewing instruction to the server.

Figure 4:
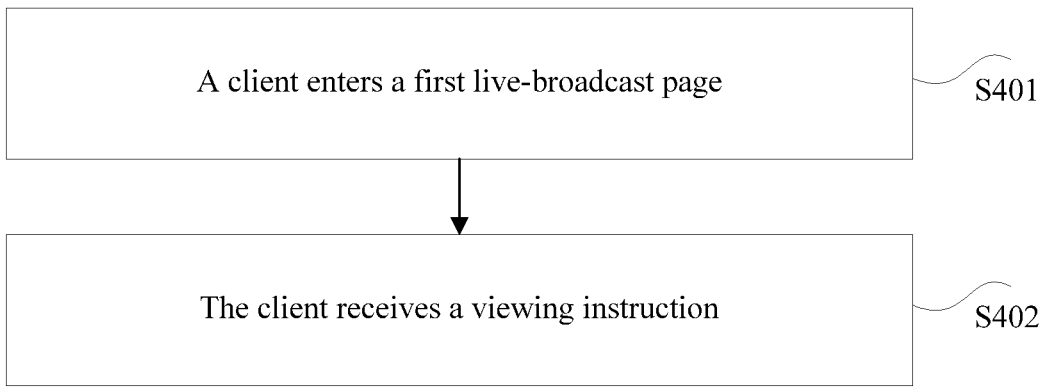
FIG. 4 is a flowchart of another video playing method according to an embodiment of the present disclosure.

FIG. 4 is a flowchart of another video playing method according to an embodiment of the present disclosure. As shown in FIG. 4, the method further includes the following steps:

Step S401. A client enters a first live-broadcast page.

In the technical solution provided in step S401 in this application, before the client sends first indication information to a server, the client enters the first live-broadcast page. The first live-broadcast page is a single unicast page and is used to live broadcast a first target video. In some embodiments, the first live-broadcast page of the client does not display video data initially.

Step S402. The client receives a viewing instruction.

In the technical solution provided in step S402 in this application, the viewing instruction is used to: request to simultaneously live broadcast a first target video and a second target video, and instruct to play the first target video in video mode and play the second target video in text mode.

The client sends the first indication information corresponding to the viewing instruction to the server, and receives first live-broadcast data sent by the server. The client simultaneously plays video data of the first target video and text data of the second target video on a second live-broadcast page, to simultaneously play the first target video and the second target video.

In an optional implementation, after step S302 of sending, by a client, first indication information to a server, and before step S304 of receiving first live-broadcast data sent by the server, the client enters the second live-broadcast page; and the client sends a page playing request to the server. Step S304 of receiving, by the client, first live-broadcast data sent by the server includes: receiving, by the client, the first live-broadcast data sent by the server in response to the page playing request.

Figure 5:
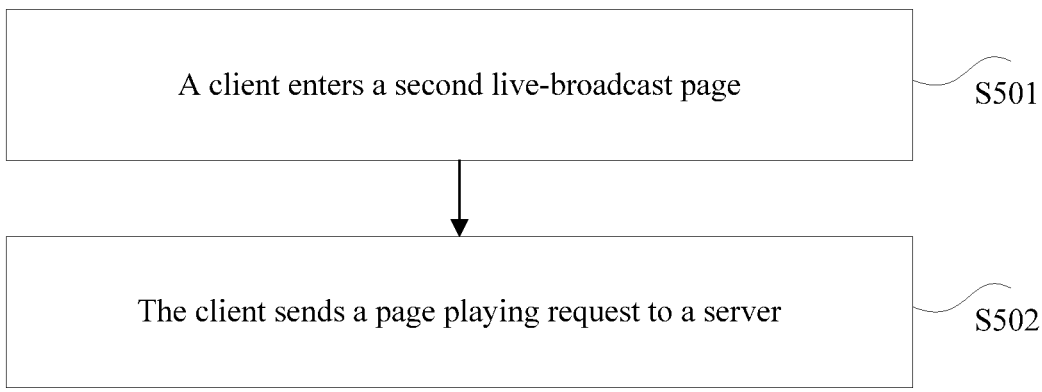
FIG. 5 is a flowchart of another video playing method according to an embodiment of the present disclosure.

FIG. 5 is a flowchart of another video playing method according to an embodiment of the present disclosure. As shown in FIG. 5, the method further includes the following steps:

Step S501. A client enters a second live-broadcast page.

In the technical solution provided in step S501 in this application, the second live-broadcast page is used to simultaneously live broadcast a first target video and a second target video, and the client enters the second live-broadcast page.

Step S502. The client sends a page playing request to a server.

In the technical solution provided in step S502 in this application, the page playing request is used to request the server to send first live-broadcast data. After the client sends the page playing request to the server, the server assembles live-broadcast data in response to the page playing request to obtain the first live-broadcast data, and the client receives the first live-broadcast data sent by the server.

In an optional implementation, after step S306 of simultaneously playing, by the client, video data of a first target video and text data of a second target video on a second live-broadcast page, the client sends a first live-broadcast switching request to the server; the client receives second live-broadcast data sent by the server in response to the first live-broadcast switching request, the second live-broadcast data including text data of the first target video and video data of the second target video; and the client simultaneously plays the text data of the first target video and the video data of the second target video on the second live-broadcast page.

Figure 6:
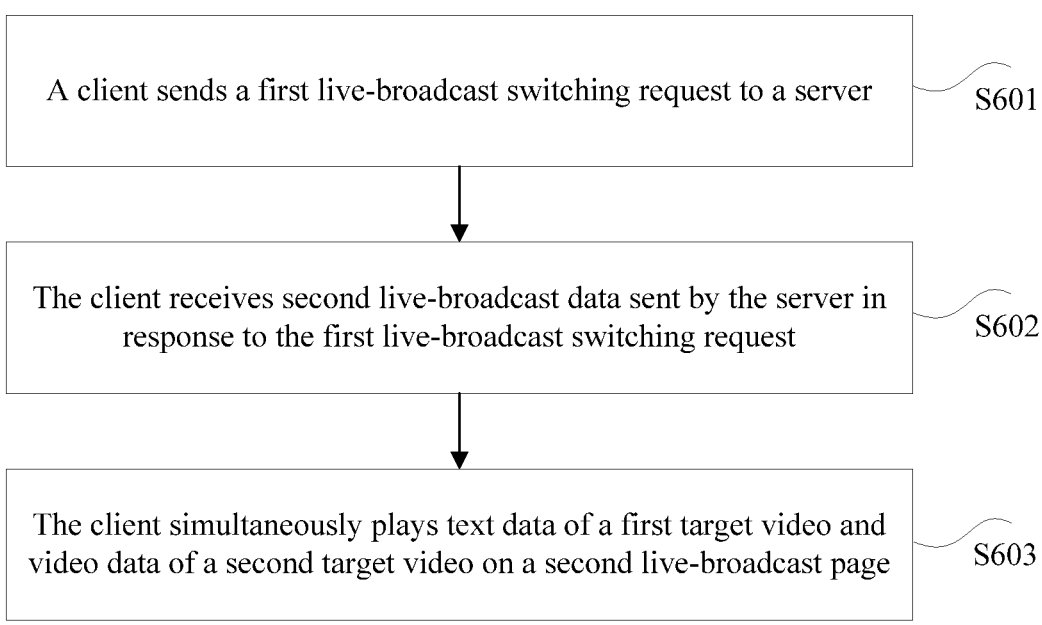
FIG. 6 is a flowchart of another video playing method according to an embodiment of the present disclosure.

FIG. 6 is a flowchart of another video playing method according to an embodiment of the present disclosure. As shown in FIG. 6, the method further includes the following steps:

Step S601. A client sends a first live-broadcast switching request to a server.

In the technical solution provided in step S601 in this application, the first live-broadcast switching request is used to request to play a first target video in text mode and play a second target video in video mode. After the client simultaneously plays video data of the first target video and text data of the second target video on a second live-broadcast page, if a user finds that content of the second target video is more entertaining, the user may switch the playing modes of the first target video and the second target video, and the client sends the first live-broadcast switching request to the server.

Step S602. The client receives second live-broadcast data sent by the server in response to the first live-broadcast switching request.

In the technical solution provided in step S602 in this application, the second live-broadcast data includes: text data of the first target video and video data of the second target video. The server stores the text data of the first target video and the video data of the second target video. After the client sends the first live-broadcast switching request to the server, the server receives the first live-broadcast switching request, and searches for, in response to the first live-broadcast switching request, the second live-broadcast data including the text data of the first target video and the video data of the second target video, and the client receives the second live-broadcast data sent by the server.

Step S603. The client simultaneously plays text data of a first target video and video data of a second target video on a second live-broadcast page.

In the technical solution provided in step S603 in this application, after the client receives the second live-broadcast data sent by the server in response to the first live-broadcast switching request, the client switches, on the second live-broadcast page, the first target video played in video mode to the first target video to be played in text mode, switches, on the second live-broadcast page, the second target video played in text mode to the second target video to be played in video mode, and directly refreshes a new second live-broadcast page to display a comprehensive live broadcast interface.

In an optional implementation, step S306 of simultaneously playing, by the client, video data of a first target video and text data of a second target video on a second live-broadcast page includes: playing, by the client, the video data of the first target video in a first window on the second live-broadcast page, and simultaneously playing the text data of the second target video in a second window on the second live-broadcast page, the first window being larger than the second window; and step S603 of simultaneously playing, by the client, text data of a first target video and video data of a second target video on a second live-broadcast page includes: playing, by the client, the video data of the second target video in the first window, and simultaneously playing the text data of the first target video in the second window.

On the second live-broadcast page of the client, there are the first window and the second window. The first window and the second window are corresponding areas in which data of a target video is played on the second live-broadcast page. Content played in the first window is a primary scenario video of a live-broadcast video, and content played in the second window is a secondary scenario video in the live-broadcast video. The first window may be displayed at the upper middle part of the second live-broadcast page, and the second window may be displayed at a lower middle part of the second live-broadcast page. No limitation is imposed thereon. The first target video is played in the first window in video mode, and the second target video is played in the second window in text mode. The user uses the first target video as a primary video to be viewed, and uses the second target video as a secondary video to be viewed.

The client plays the video data of the second target video in the first window, and simultaneously plays the text data of the first target video in the second window. That is, the second target video is played in the first window in video mode, and the first target video is played in the second window in text mode. The user uses the second target video as a primary video to be viewed, and uses the first target video as a secondary video to be viewed.

In some embodiments, a plurality of live-broadcast videos may be simultaneously played on the second live-broadcast page. The first live-broadcast video may be played in a mode of displaying video images with audio in a large window, and another second live-broadcast video may be played in a mode of displaying video images without sound in a small window or may be played in a mode of displaying text content without sound in a small window. When switching is performed on the second live-broadcast video, only a corresponding area on the second live-broadcast video needs to be clicked, then a small window in which the second live-broadcast video is displayed is switched to a large window to display the video images of the second live-broadcast video together with the audio of the second live-broadcast video. A large window in which the first live-broadcast video is displayed is switched to a small window to display the video images of the first live-broadcast video without the audio of the second live-broadcast video, or display the text content of the first live-broadcast video without the audio of the first live-broadcast video.

In an optional implementation, after step S306 of simultaneously playing, by the client, video data of a first target video and text data of a second target video on a second live-broadcast page, the client sends a second live-broadcast switching request to the server; the client receives third live-broadcast data sent by the server in response to the second live-broadcast switching request; and the client simultaneously plays the video data of the third target video and the text data of the second target video on the second live-broadcast page.

Figure 7:
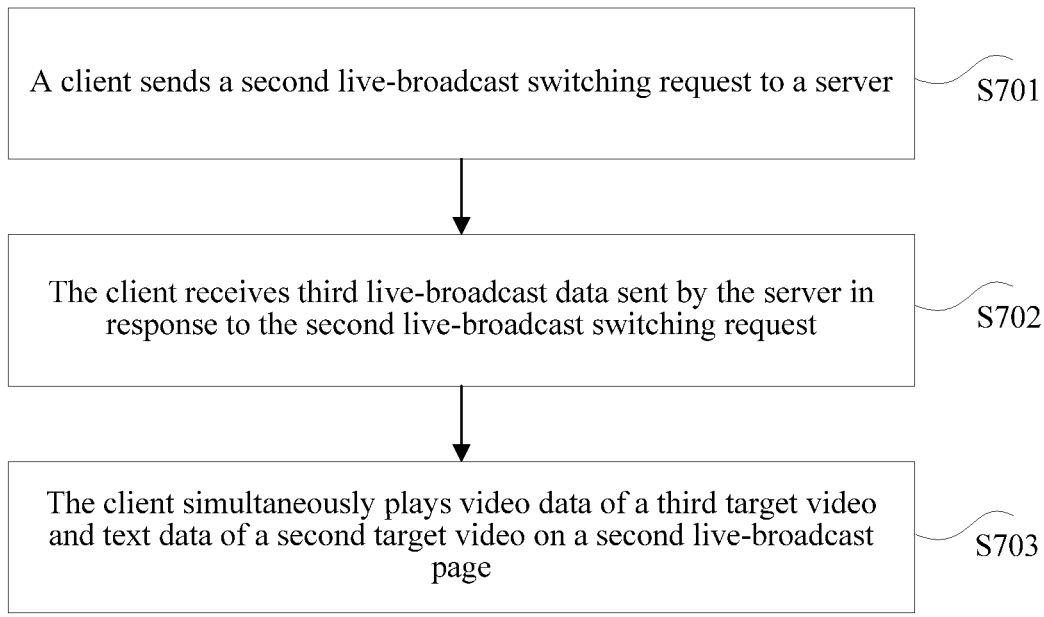
FIG. 7 is a flowchart of another video playing method according to an embodiment of the present disclosure.

FIG. 7 is a flowchart of another video playing method according to an embodiment of the present disclosure. As shown in FIG. 7, the method further includes the following steps:

Step S701. A client sends a second live-broadcast switching request to a server.

In the technical solution provided in step S701 in this application, the second live-broadcast switching request is used to: request to switch a first target video to a third target video, and instruct to play the third target video in video mode and play the second target video in text mode.

The client simultaneously plays video data of a first target video and text data of a second target video on a second live-broadcast page. A user views video images of the displayed first target video and listens to audio of the first target video, and matches text of the second target video. If the user finds content of the third target video more entertaining, the user may switch the first target video to the third target video, and play the third target video in video mode. When the first target video is a live-broadcast video that is played in a large window in video mode, the third target video may be a video that is temporarily played in a small window in video mode without sound. The client sends the second live-broadcast switching request to the server.

Step S702. The client receives third live-broadcast data sent by the server in response to the second live-broadcast switching request.

In the technical solution provided in step S702 in this application, the third live-broadcast data includes: video data of the third target video and the text data of the second target video. The server stores the video data of the third target video and the video data of the second target video. After the client sends the second live-broadcast switching request to the server, the server receives the second live-broadcast switching request, responds to the second live-broadcast switching request to obtain the third live-broadcast data including the video data of the third target video and the text data of the second target video, and sends the third live-broadcast data to the client. The client receives the third live-broadcast data sent by the server.

Step S703. The client simultaneously plays video data of a third target video and text data of a second target video on a second live-broadcast page.

In the technical solution provided in step S703 in this application, after the client receives the third live-broadcast data that is sent by the server in response to the second live-broadcast switching request, the first target video played on the second live-broadcast page in video mode is switched to the third target video played in video mode, video images of the third target video are displayed and audio of the third target video is played, and in addition, the second target video is played in text mode, and the second live-broadcast page is refreshed to display a comprehensive live broadcast interface.

In an optional implementation, step S306 of simultaneously playing, by the client, video data of a first target video and text data of a second target video on a second live-broadcast page includes: playing, by the client, the video data of the first target video in a first window on the second live-broadcast page, and simultaneously playing the text data of the second target video in a second window on the second live-broadcast page, the first window being larger than the second window; and step S703 of simultaneously playing, by the client, video data of a third target video and text data of a second target video on the second live-broadcast page includes: playing, by the client, the video data of the third target video in the first window, and simultaneously playing the text data of the second target video in the second window.

After receiving the third live-broadcast data that includes the video data of the third target video and the text data of the second target video and that is sent by the server in response to the second live-broadcast switching request, the third target video is played in the first window in video mode, and the second target video is played in the second window in text mode. An area in which the third target video is displayed on the second live-broadcast page is larger than an area in which the second target video is displayed on the second live-broadcast page. The user uses the third target video as a primary video to be viewed, and uses the second target video as a secondary video to be viewed.

In some embodiments, a plurality of live-broadcast videos may be simultaneously played on the second live-broadcast page. A first live-broadcast video is played in a first window in a mode of displaying video images with audio, a second live-broadcast video is displayed in a second window in text mode, and the third live-broadcast video is played in a third window in a mode of displaying video images without audio. When the first live-broadcast video is switched to the third live-broadcast video, only a corresponding area in the third live-broadcast video needs to be clicked, then the third live-broadcast video played in the third window in video mode is switched to audio to be played in the first window in video mode with the third live-broadcast video, and the first live-broadcast video played in the first window in video mode is switched to audio to be played in the third window in video mode without the first live-broadcast video, so that the plurality of live-broadcast videos is seamlessly switched between each other, thereby enriching a function of playing live-broadcast videos on a same live-broadcast page.

In an optional the implementation, after the simultaneously playing, by the client, the video data of the first target video and the text data of the second target video on a second live-broadcast page, the client sends a third live-broadcast switching request to the server; the client receives fourth live-broadcast data sent by the server in response to the third live-broadcast switching request; and the client simultaneously plays the video data of the first target video and the text data of the fourth target video on the second live-broadcast page.

Figure 8:
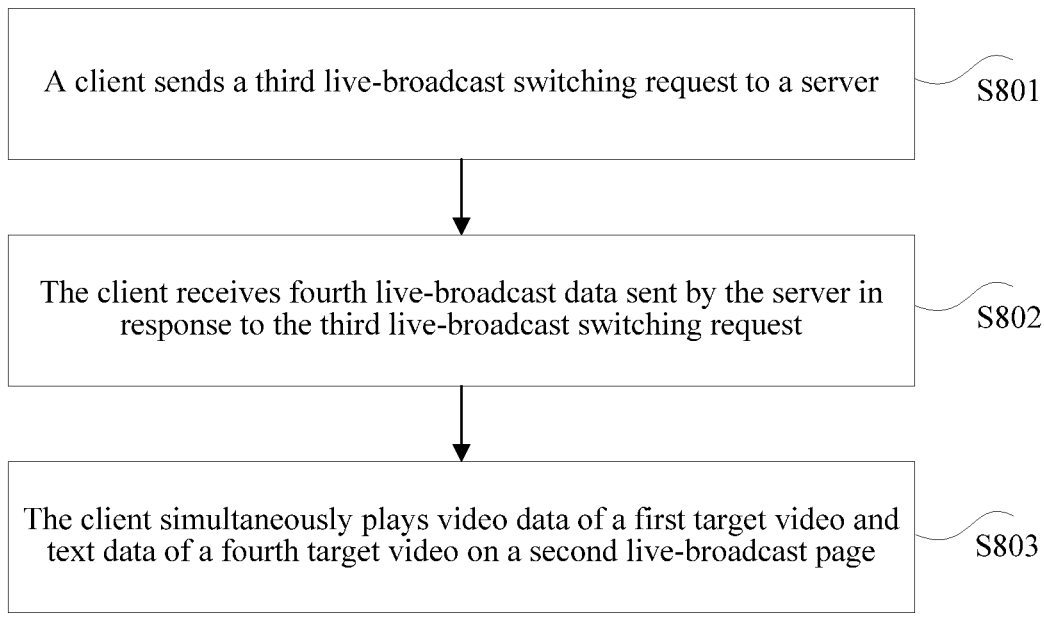
FIG. 8 is a flowchart of another video playing method according to an embodiment of the present disclosure.

FIG. 8 is a flowchart of another video playing method according to an embodiment of the present disclosure. As shown in FIG. 8, the method further includes the following steps:

Step S801. A client sends a third live-broadcast switching request to a server.

In the technical solution provided in step S801 in this application, the third live-broadcast switching request is used to request to: switch a second target video to a fourth target video, and play the fourth target video in text mode and play a first target video in video mode.

The client simultaneously plays video data of the first target video and text data of the second target video on a second live-broadcast page. A user views video images of the displayed first target video and listens to audio of the first target video, and matches text of the second target video. If the user finds content of the fourth target video more entertaining, the second target video may be switched to the fourth target video. The client sends the third live-broadcast switching request to the server.

Step S802. The client receives fourth live-broadcast data sent by the server in response to the third live-broadcast switching request.

In the technical solution provided in step S802 in this application, the fourth live-broadcast data includes: video data of the first target video and text data of the second target video. The server stores the video data of the first target video and the text data of the fourth target video. After the client sends the third live-broadcast switching request to the server, the server receives the third live-broadcast switching request, responds to the third live-broadcast switching request to obtain the fourth live-broadcast data including the video data of the first target video and the text data of the fourth target video. The fourth live-broadcast data is comprehensive live-broadcast page data. The client receives the fourth live-broadcast data sent by the server.

Step S803. The client simultaneously plays video data of a first target video and text data of a fourth target video on a second live-broadcast page.

In the technical solution provided in step S803 in this application, after the client receives the fourth live-broadcast data sent by the server in response to the third live-broadcast switching request, the second target video played on the second live-broadcast page in text mode is switched to the fourth target video to be played in text mode, text content of the fourth target video is displayed, and in addition, the first target video is played in video mode on the second live-broadcast page, and the second live-broadcast page is refreshed to display a comprehensive live broadcast interface.

In an optional implementation, step S306 of simultaneously playing, by the client, video data of a first target video and text data of a second target video on a second live-broadcast page includes: playing, by the client, the video data of the first target video in a first window on the second live-broadcast page, and simultaneously playing the text data of the second target video in a second window on the second live-broadcast page, the first window being larger than the second window; and step S803 of simultaneously playing, by the client, video data of a first target video and text data of a fourth target video on a second live-broadcast page includes: playing, by the client, the video data of the first target video in the first window, and simultaneously playing the text data of the fourth target video in the second window.

After receiving the fourth live-broadcast data sent by the server in response to the third live-broadcast switching request and that includes the video data of the first target video and the text data of the fourth target video, the client plays the fourth target video in the second window in video mode, and plays the first target video in the first window in video mode. An area in which the first target video is displayed on the second live-broadcast page is larger than an area in which the fourth target video is displayed on the second live-broadcast page.

In an optional implementation, the first indication information is further used to instruct to play the first target video in the first window, and play the second target video in the second window. The first window is larger than the second window, so that the areas in which the first target video and the second target video are played on the second live-broadcast page are determined.

In an optional implementation, the first indication information is further configured to instruct to play audio of a target video in the first window, and turn off audio of the target video played in the second window. The first window is larger than the second window, so that impact caused by the target video played in the second window to the target video played in the first window is reduced.

The technical solutions of the present disclosure are described below with reference to exemplary embodiments.

Figure 9:
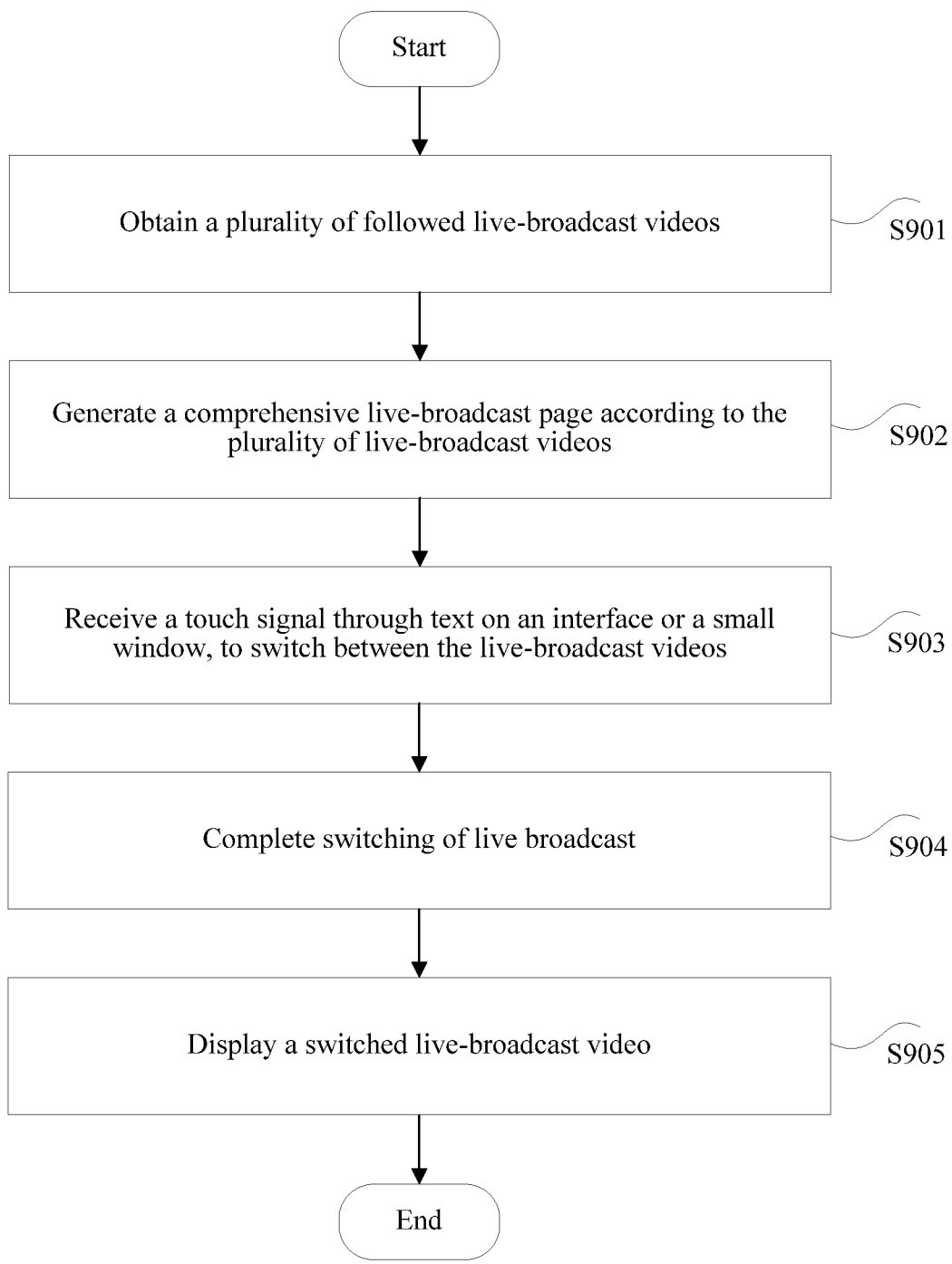
FIG. 9 is a flowchart of another video playing method according to an embodiment of the present disclosure.

FIG. 9 is a flowchart of another video playing method according to an embodiment of the present disclosure. As shown in FIG. 9, the method includes the following steps:

Step S901. Obtain a plurality of followed live-broadcast videos. On a live unicast page, a plurality of followed live-broadcast videos is obtained. The plurality of followed live-broadcast videos may be selected to be played in video mode, in text mode, in a small window mode, or in a large window mode. In some embodiments, the user follows the plurality of live-broadcast videos. One live-broadcast video is live broadcast in video mode, and the other live-broadcast videos are live broadcast in text mode.

Step S902. Generate a comprehensive live-broadcast page according to the plurality of live-broadcast videos.

Step S903. Receive a touch signal through text on an interface on the client or a small window, to switch between the live-broadcast videos. The touch signal may be a signal generated through clicking, tapping, double-tapping, or staying for a target time in a target area. In some embodiments, an area corresponding to the text on the interface on the client is clicked, or an area corresponding to the small window is clicked. In this way, a live-broadcast video played in a large window is switched to be played in a small window mode or in text mode, and a live-broadcast video played in a small window mode or in text mode is switched to be played in a large window mode, thereby switching the live-broadcast video.

Step S904. Complete switching of live broadcast.

Step S905. Display a switched live-broadcast video.

In the embodiment, a plurality of followed live-broadcast videos is obtained, the comprehensive live-broadcast page is generated according to the plurality of live-broadcast videos, and the text on the interface of the client or the small window is clicked to switch the live-broadcast videos, complete live broadcast switching, and displayed the switched live-broadcast video. Therefore, the user can seamlessly switch the live-broadcast videos by selecting a mode of a video+text or a mode of a large video window+a small video window, a requirement of the user on diversification is met, and a technical effect of a function of playing live-broadcast videos on a same live-broadcast page is achieved.

Figure 10:
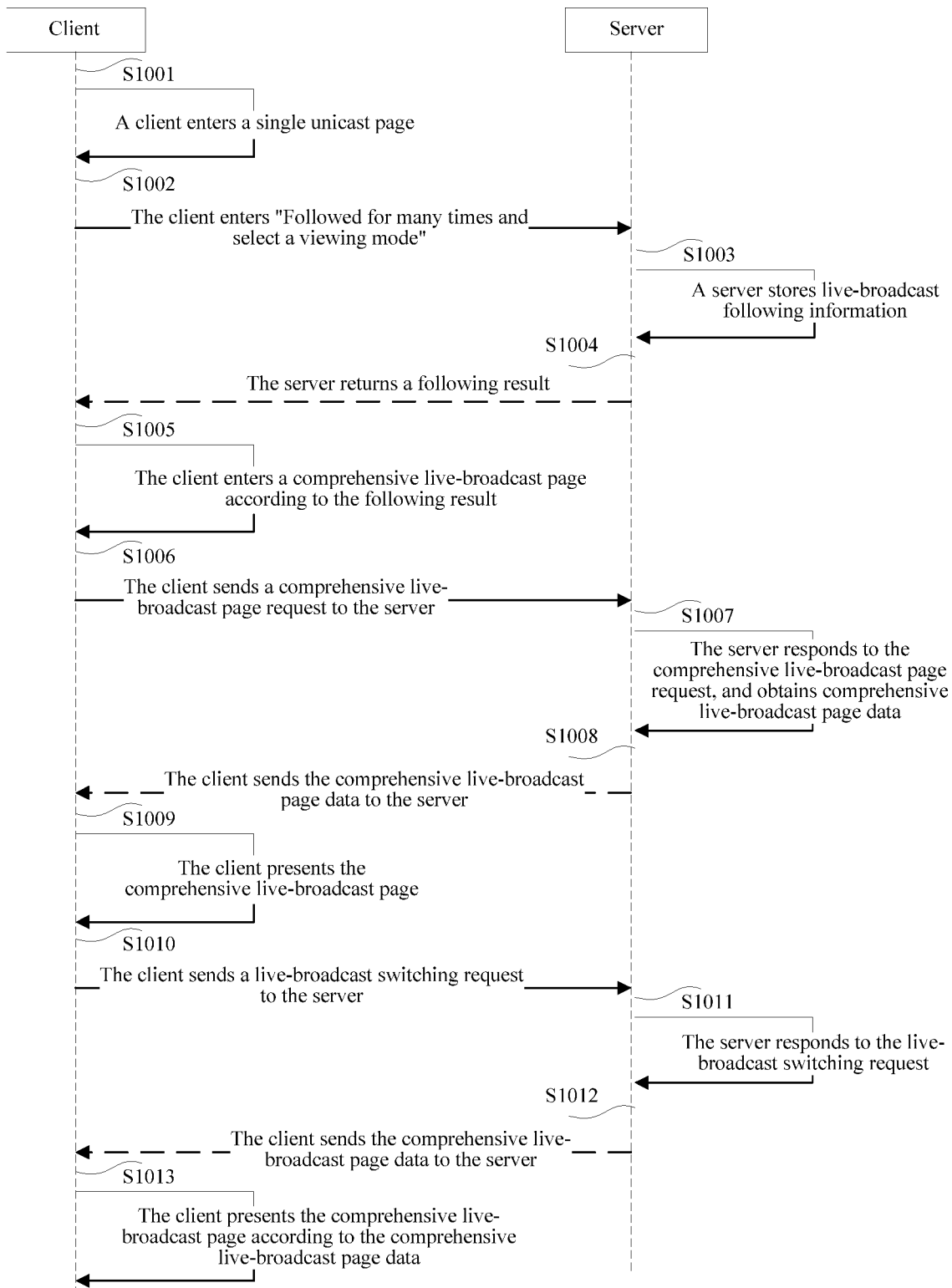
FIG. 10 is a schematic interaction diagram of a video playing method according to an embodiment of the present disclosure.

FIG. 10 is a schematic interaction diagram of a video playing method according to an embodiment of the present disclosure. As shown in FIG. 10, the video playing method includes the following steps:

Step S1001. A client enters a single unicast page.

Step S1002. The client enters "Followed for many times and select a viewing mode".

After the client enters the single unicast page, the client enters "Followed for many times" and selects the viewing mode. Different viewing modes correspond to different playing modes of a live-broadcast video. For example, viewing in video mode corresponds to playing the live-broadcast video in video mode; viewing in text mode corresponds to playing the live-broadcast video in text mode; viewing in a large window mode corresponds to playing the live-broadcast video in a large window mode; and viewing in a small window mode corresponds to playing the live-broadcast video in a small window mode.

Step S1003. A server stores live-broadcast following information. The server stores live-broadcast following information of "Followed for many times and select a viewing mode".

Step S1004. The server returns a following result, for example, returns a result that the live-broadcast following information is successfully stored.

Step S1005. The client enters a comprehensive live-broadcast page according to the following result.

Step S1006. The client sends a comprehensive live-broadcast page request to the server. The comprehensive live-broadcast page request is used to request the server for comprehensive live-broadcast page data, where the comprehensive live-broadcast page data may include video data of a first target video to be live broadcast and text data of a second target video to be live broadcast.

Step S1007. The server responds to the comprehensive live-broadcast page request, and obtains the comprehensive live-broadcast page data.

Step S1008. The client sends the comprehensive live-broadcast page data to the server. The comprehensive live-broadcast page data may include data for playing the first target video in video mode, and data for playing the second target video in text mode.

Step S1009. The client presents the comprehensive live-broadcast page, and the client presents a comprehensive live-broadcast interface according to the comprehensive live-broadcast page data, for example, plays the first target video in video mode and plays the second target video in text mode.

Step S1010. The client sends a live-broadcast switching request to the server.

Step S1011. The server responds to the live-broadcast switching request, where the live-broadcast switching request may be used to request to play the first target video in text mode, and play the second target video in video mode.

Step S1012. The server sends the comprehensive live-broadcast page data to the client, for example, sends text data of the first target video and video data of the second target video.

Step S1013. The client presents the comprehensive live-broadcast page according to the comprehensive live-broadcast page data. For example, the client switches the first target video played in video mode to the first target video to be played in text mode, and switches the second target video played in text mode to the second target video to be played in video mode.

In this embodiment, viewing playing content of a plurality of live-broadcast videos on one playing page is supported. The user may select to simultaneously play, on a playing page, a video to be played in a video playing mode and a video to be played in a text playing mode, or may select to simultaneously play, on a playing page, a video to be played in a large window mode and a video to be played in a small window mode, so that the live-broadcast videos are seamlessly switched between each other, thereby meeting requirements of the user on diversification.

This embodiment may be applicable to the following two scenarios:

In a first scenario, when the user views a first live-broadcast video played in video mode, other followed second live-broadcast videos are played in text mode. If a second live-broadcast video is more entertaining, when the user intends to switch to the second live-broadcast video, the user only needs to click a corresponding text area of the second live-broadcast video, so that the second live-broadcast video played in text mode is switched to the second live-broadcast video to be played in video mode; and the first live-broadcast video played in video mode is switched to the first live-broadcast video to be played in text mode, so that a requirement that the user views a plurality of live-broadcast videos simultaneously is met, and the plurality of live-broadcast videos are seamlessly switched between each other.

In a second scenario, the user may view a plurality of live-broadcast videos simultaneously, including a first live-broadcast video whose video images are displayed with audio on a large window, and a second live-broadcast video whose video images are displayed without audio on a plurality of small windows. When the live-broadcast videos are switched between each other, only a small window corresponding to the second live-broadcast video needs to be clicked. In this case, the small window corresponding to the second live-broadcast video is switched to a large window with audio of the second live-broadcast video; and the large window corresponding to the first live-broadcast video is switched to a small window without the audio of the first live-broadcast video. In this way, video sound is switched when a video image displayed in a large window is switched to a video image displayed in a small window, a requirement that the user views a plurality of live-broadcast videos simultaneously is met, and the plurality of live-broadcast videos is seamlessly switched, thereby enriching a function of playing live-broadcast videos on a same live-broadcast pages.

It should be noted that, for simple description, the foregoing method embodiments are represented as a series of actions, but a person skilled in the art should appreciate that the present disclosure is not limited to the described order of the actions because some steps may be performed in another order or performed simultaneously according to the present disclosure. In addition, a person skilled in the art should also know that all the embodiments described in this specification are exemplary embodiments, and the related actions and modules are not necessarily required in the present disclosure.

Through the foregoing description of the implementations, it is clear to a person skilled in the art that the present disclosure may be implemented by software plus a necessary universal hardware platform, and certainly may also be implemented by hardware, but in many cases, the software implementation is exemplary. Based on such an understanding, the technical solutions of the present disclosure or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to the embodiments of the present disclosure.

Figure 11:
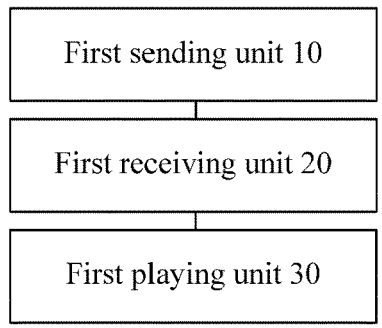
FIG. 11 is a schematic diagram of a video playing apparatus according to an embodiment of the present disclosure.

According to the embodiments of the present disclosure, video playing apparatuses configured to implement the foregoing video playing methods are further provided. FIG. 11 is a schematic diagram of a video playing apparatus according to an embodiment of the present disclosure. As shown in FIG. 11, the apparatus may include: a first sending unit 10, a first receiving unit 20, and a first playing unit 30.

The first sending unit 10 is configured to send first indication information to a server by using a client, the first indication information being used to instruct to play, in video mode, a first target video to be live broadcast, and instruct to play, in text mode, a second target video to be live broadcast.

The first receiving unit 20 is configured to receive first live-broadcast data sent by the server, the first live-broadcast data including video data of the first target video and text data of the second target video.

The first playing unit 30 is configured to simultaneously play the video data of the first target video and the text data of the second target video on a second live-broadcast page of the client.

It should be noted that, the first sending unit 10, the first receiving unit 20, and the first playing unit 30 herein may run on a terminal as a part of the apparatus, and may perform, by using a processor in the terminal, the functions implemented by the foregoing units. The terminal may be a terminal device such as a smartphone (such as an Android mobile phone and an iOS mobile phone), a tablet computer, a palmtop computer, a MID, and a PAD.

Figure 12:
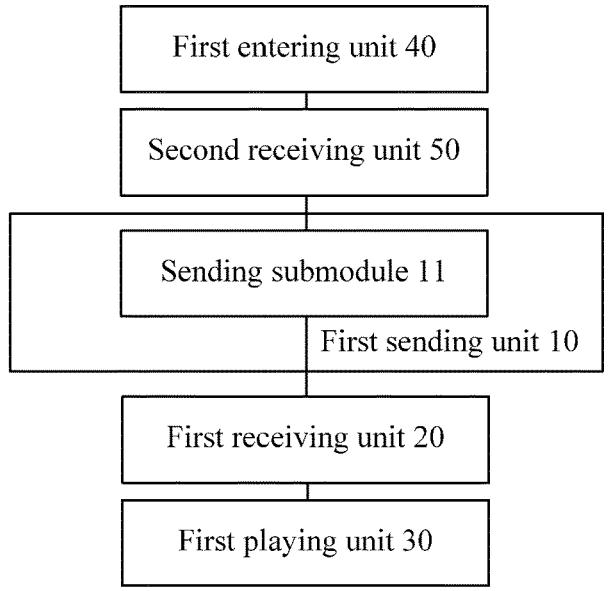
FIG. 12 is a schematic diagram of another video playing apparatus according to an embodiment of the present disclosure.

FIG. 12 is a schematic diagram of another video playing apparatus according to an embodiment of the present disclosure. As shown in FIG. 12, the apparatus may include: a first sending unit 10, a first receiving unit 20, and a first playing unit 30. The apparatus may further include: a first entering unit 40 and a second receiving unit 50. The first sending unit 10 may include a sending submodule 11.

The first entering unit 40 is configured to: before first indication information is sent to a server by using a client, enter a first live-broadcast page on the client, the first live-broadcast page being used to live broadcast the first target video.

The second receiving unit 50 is configured to receive a viewing instruction by using the client, the viewing instruction being used to: request to simultaneously live broadcast a first target video and a second target video, and instruct to play the first target video in video mode and play the second target video in text mode.

The first sending unit 10 includes: a sending submodule 11, configured to send, by using the client, the first indication information corresponding to the viewing instruction to the server.

It should be noted that, the first entering unit 40, the second receiving unit 50, and the sending submodule 11 herein may run on a terminal as a part of the apparatus, and may perform, by using a processor in the terminal, the functions implemented by the foregoing units and module. The terminal may be a terminal device such as a smartphone (such as an Android mobile phone and an iOS mobile phone), a tablet computer, a palmtop computer, a MID, and a PAD.

Figure 13:
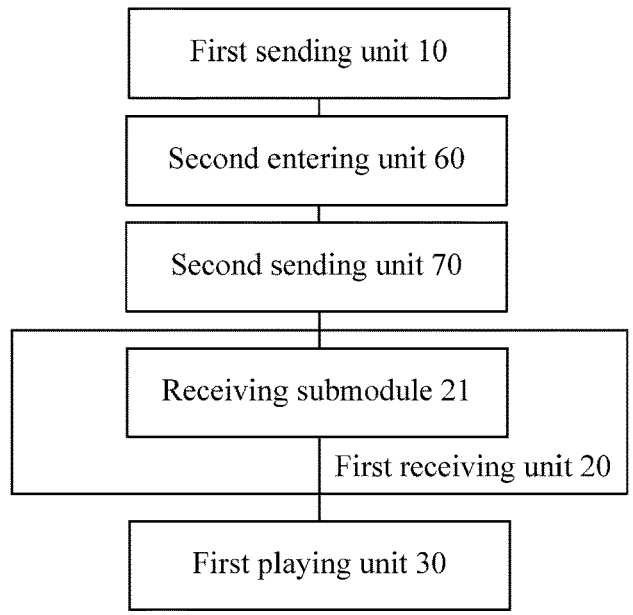
FIG. 13 is a schematic diagram of another video playing apparatus according to an embodiment of the present disclosure.

FIG. 13 is a schematic diagram of another video playing apparatus according to an embodiment of the present disclosure. As shown in FIG. 13, the apparatus may include: a first sending unit 10, a first receiving unit 20, and a first playing unit 30. The apparatus may further include: a second entering unit 60 and a second sending unit 70. The first receiving unit 20 may include a receiving submodule 21.

The second entering unit 60 is configured to: after first indication information is sent to a server by using a client, and before first live-broadcast data sent by the server is received, enter a second live-broadcast page on the client, the second live-broadcast page being used to simultaneously live broadcast a first target video and a second target video.

The second sending unit 70 is configured to send a page playing request to the server by using the client.

The first receiving unit 20 includes a receiving submodule 21, configured to receive the first live-broadcast data sent by the server in response to the page playing request.

It should be noted that, the second entering unit 60, the second sending unit 70, and the receiving submodule 21 herein may run on a terminal as a part of the apparatus, and may perform, by using a processor in the terminal, the functions implemented by the foregoing units and module. The terminal may be a terminal device such as a smartphone (such as an Android mobile phone and an iOS mobile phone), a tablet computer, a palmtop computer, a MID, and a PAD.

Figure 14:
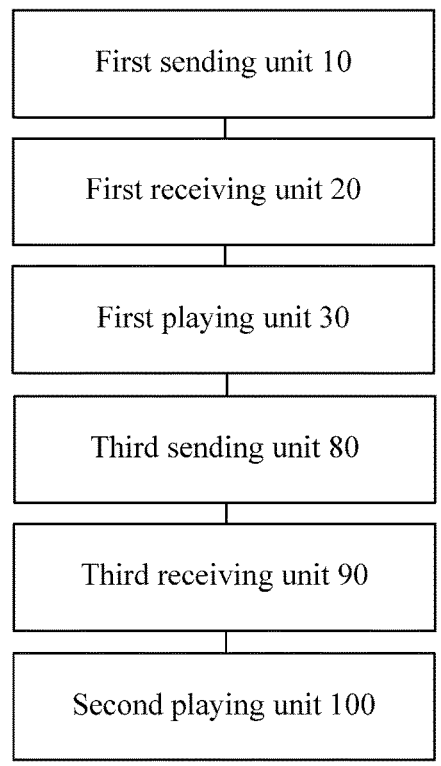
FIG. 14 is a schematic diagram of another video playing apparatus according to an embodiment of the present disclosure.

FIG. 14 is a schematic diagram of another video playing apparatus according to an embodiment of the present disclosure. As shown in FIG. 14, the apparatus may include: a first sending unit 10, a first receiving unit 20, and a first playing unit 30. The apparatus may further include: a third sending unit 80, a third receiving unit 90, and a second playing unit 100.

The third sending unit 80 is configured to: after video data of a first target video is played on a second live-broadcast page and text data of a second target video is simultaneously played, send, by using a client, a first live-broadcast switching request to a server, the first live-broadcast switching request being used to request to play the first target video in text mode and play the second target video in video mode.

The third receiving unit 90 is configured to receive second live-broadcast data sent by the server in response to the first live-broadcast switching request, the second live-broadcast data including text data of the first target video and video data of the second target video.

The second playing unit 100 is configured to simultaneously play the text data of the first target video and the video data of the second target video on the second live-broadcast page.

It should be noted that, the third sending unit 80, the third receiving unit 90, and the second playing unit 100 herein may run on a terminal as a part of the apparatus, and may perform, by using a processor in the terminal, the functions implemented by the foregoing units. The terminal may be a terminal device such as a smartphone (such as an Android mobile phone and an iOS mobile phone), a tablet computer, a palmtop computer, a MID, and a PAD.

In some embodiments, the first playing unit 30 includes a first playing module, configured to: play the video data of the first target video in a first window on the second live-broadcast page, and simultaneously play the text data of the second target video in a second window on the second live-broadcast page, the first window being larger than the second window; and the second playing unit 100 includes a second playing module, configured to: play the video data of the second target video in the first window, and simultaneously play the text data of the first target video in the second window.

It should be noted that, the first playing module and the second playing module herein may run on a terminal as a part of the apparatus, and may perform, by using a processor in the terminal, the functions implemented by the foregoing modules. The terminal may be a terminal device such as a smartphone (such as an Android mobile phone and an iOS mobile phone), a tablet computer, a palmtop computer, a MID, and a PAD.

In some embodiments, the apparatus further includes: a fourth sending unit, a fourth receiving unit, and a third playing unit. The fourth sending unit is configured to: after the video data of the first target video is played on the second live-broadcast page, and the text data of the second target video is simultaneously played, send, by using the client, a second live-broadcast switching request to the server, the second live-broadcast switching request being used to request to switch the first target video to a third target video, and play the third target video in video mode and play the second target video in text mode. The fourth receiving unit is configured to receive third live-broadcast data sent by the server in response to the second live-broadcast switching request, the third live-broadcast data including video data of the third target video and the text data of the second target video. The third playing unit is configured to simultaneously play the video data of the third target video and the text data of the second target video on the second live-broadcast page.

It should be noted that, the fourth sending unit, the fourth receiving unit, and the third playing unit herein may run on a terminal as a part of the apparatus, and may perform, by using a processor in the terminal, the functions implemented by the foregoing units. The terminal may be a terminal device such as a smartphone (such as an Android mobile phone and an iOS mobile phone), a tablet computer, a palmtop computer, a MID, and a PAD.

In some embodiments, the first playing unit 30 includes a first playing module, configured to: play the video data of the first target video in a first window on the second live-broadcast page, and simultaneously play the text data of the second target video in a second window on the second live-broadcast page, the first window being larger than the second window; and the third playing unit includes a third playing module, configured to: play the video data of the third target video in the first window, and simultaneously play the text data of the second target video in the second window.

It should be noted that, the first playing module and the third playing module herein may run on a terminal as a part of the apparatus, and may perform, by using a processor in the terminal, the functions implemented by the foregoing modules. The terminal may be a terminal device such as a smartphone (such as an Android mobile phone and an iOS mobile phone), a tablet computer, a palmtop computer, a MID, and a PAD.

In some embodiments, the apparatus further includes: a fifth sending unit, a fifth receiving unit and a fourth playing unit. The fifth sending unit is configured to: after the video data of the first target video is played on the second live-broadcast page, and the text data of the second target video is simultaneously played, send, by using the client, a third live-broadcast switching request to the server, the third live-broadcast switching request being used to request to switch the second target video to a fourth target video, play the fourth target video in text mode, and play the first target video in video mode. The fifth receiving unit is configured to receive fourth live-broadcast data sent by the server in response to the third live-broadcast switching request, the fourth live-broadcast data including the video data of the first target video and text data of the fourth target video. The fourth playing unit is configured to simultaneously play the video data of the first target video and the text data of the fourth target video on the second live-broadcast page.

It should be noted that, the fifth sending unit, the fifth receiving unit, and the fourth playing unit herein may run on a terminal as a part of the apparatus, and may perform, by using a processor in the terminal, the functions implemented by the foregoing units. The terminal may be a terminal device such as a smartphone (such as an Android mobile phone and an iOS mobile phone), a tablet computer, a palmtop computer, a MID, and a PAD.

In some embodiments, the first playing unit 30 includes a first playing module, configured to: play the video data of the first target video in a first window on the second live-broadcast page, and simultaneously play the text data of the second target video in a second window on the second live-broadcast page, the first window being larger than the second window; and the fourth playing unit includes a fourth playing module, configured to: play the video data of the first target video in the first window, and simultaneously play the text data of the fourth target video in the second window.

It should be noted that, the first playing module and the fourth playing module herein may run on a terminal as a part of the apparatus, and may perform, by using a processor in the terminal, the functions implemented by the foregoing modules. The terminal may be a terminal device such as a smartphone (such as an Android mobile phone and an iOS mobile phone), a tablet computer, a palmtop computer, a MID, and a PAD.

In some embodiments, the first indication information is further used to instruct to play the first target video in the first window, and play the second target video in the second window, the first window being larger than the second window.

In some embodiments, the first indication information is further used to instruct to play audio of a target video in the first window, and turn off audio of a target video played in the second window, the first window being larger than the second window.

It should be noted that, the first sending unit 10 in this embodiment may be configured to perform step S302 in the embodiments of this application, the first receiving unit 20 in this embodiment may be configured to perform step S304 in the embodiments of this application, and the first playing unit 30 in this embodiment may be configured to perform step S306 in the embodiments of this application.

In this embodiment, the first indication information is sent to the server by using the client, the video data of the first target video and the text data of the second target video that are sent by the server according to the indication information are played on the second live-broadcast page of the client, so that the first target video and the second target video are simultaneously played, a technical effect that a function of playing live-broadcast videos on a same live-broadcast page is enriched is achieved, and a problem in the related technology that the function of playing live-broadcast videos on a same live-broadcast page is monotonous is further resolved.

Herein, it should be noted that, examples and application scenarios implemented by the foregoing units and modules are corresponding steps are the same, and are not limited to the content disclosed in the foregoing embodiments. It should be noted that, the foregoing module can run on the hardware environment shown in FIG. 2 as a part of the apparatus, and may be implemented by software, or may be implemented by hardware. The hardware environment includes a network environment.

According to another aspect of the embodiments of the present disclosure, a terminal configured to implement the foregoing video playing method is further provided. The terminal may be a computer terminal, and the computer terminal may be any computer terminal device in a computer terminal cluster. In some embodiments, in this embodiment, the foregoing computer terminal may be replaced with a terminal device such as a mobile terminal.

In some embodiments, in this embodiment, the foregoing computer terminal may be located in at least one of a plurality of network devices in a computer network.

Figure 15:
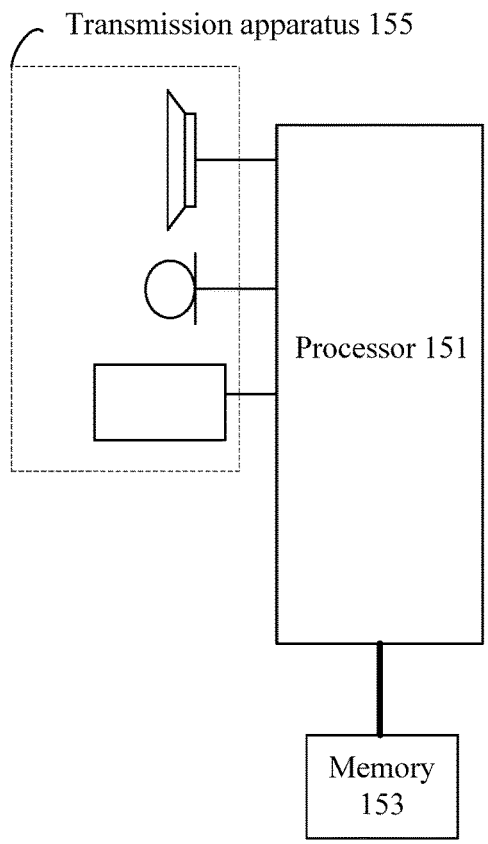
FIG. 15 is a structural block diagram of a terminal according to an embodiment of the present disclosure.

FIG. 15 is a structural block diagram of a terminal according to an embodiment of the present disclosure. As shown in FIG. 15, the terminal may include: one or more (only one processor is shown in the figure) processors 151, a memory 153, and a transmission apparatus 155.

The memory 153 may be configured to store a software program and module, for example, program instructions/modules corresponding to the video playing methods and apparatuses in the embodiments of the present disclosure. The processor 151 runs the software program and module in the memory 153 to implement various function application and data processing, that is, implement the video playing method. The memory 153 may include a high speed random access memory, and may further include a non-volatile memory, for example, one or more magnetic storage apparatuses, a flash memory, or another non-volatile solid-state memory. In some examples, the memory 153 may further include a memory disposed remote to the processor 151, and the remote memory may be connected to the terminal through a network. Examples of the network include but are not limited to, the Internet, an intranet, a local area network, a mobile communications network, and a combination thereof.

The transmission apparatus 155 is configured to receive or send data by means of a network, or may further be configured to transmit data between the processor and the memory. Specific examples of the foregoing network may include a wired network and a wireless network. In an example, the transmission apparatus 155 includes a network interface controller (NIC), which may be connected to another network device and router by using a cable, so as to communicate with the Internet or a local area network. In an example, the transmission apparatus 155 is a radio frequency (RF) module, which communicates with the Internet in a wireless manner.

Specifically, the memory 153 is configured to store an application.

The processor 151 may invoke, by using the transmission apparatus 155, the application stored in the memory 153, to execute program code of the steps of the methods in optional or exemplary embodiments in the foregoing method embodiments, including: sending, by a client, first indication information to a server, the first indication information being used to instruct to play, in video mode, a first target video to be live broadcast, and instruct to play, in text mode, a second target video to be live broadcast; receiving, by the client, first live-broadcast data sent by the server, the first live-broadcast data including video data of the first target video and text data of the second target video; and simultaneously playing, by the client, the video data of the first target video and the text data of the second target video on a second live-broadcast page.

The processor 151 is further configured to perform the following steps: before the sending, by a client, first indication information to a server, entering, by the client, a first live-broadcast page, the first live-broadcast page being used to live broadcast the first target video; and receiving, by the client, a viewing instruction, the viewing instruction being used to: request to simultaneously live broadcast the first target video and the second target video, and instruct to play the first target video in video mode and play the second target video in text mode; and sending, by the client, the first indication information corresponding to the viewing instruction to the server.

The processor 151 is further configured to perform the following steps: after the sending, by a client, first indication information to a server, and before the receiving first live-broadcast data sent by the server, entering, by the client, the second live-broadcast page, the second live-broadcast page being used to simultaneously live broadcast the first target video and the second target video; and sending, by the client, a page playing request to the server; and receiving, by the client, the first live-broadcast data sent by the server in response to the page playing request.

The processor 151 is further configured to perform the following steps: after the simultaneously playing, by the client, the video data of the first target video and the text data of the second target video on a second live-broadcast page, sending, by the client, a first live-broadcast switching request to the server, the first live-broadcast switching request being used to request to play the first target video in text mode and play the second target video in video mode; receiving, by the client, second live-broadcast data sent by the server in response to the first live-broadcast switching request, the second live-broadcast data including text data of the first target video and video data of the second target video; and simultaneously playing, by the client, the text data of the first target video and the video data of the second target video on the second live-broadcast page.

The processor 151 is further configured to perform the following steps: playing, by the client, the video data of the first target video in a first window on the second live-broadcast page, and simultaneously playing the text data of the second target video in a second window on the second live-broadcast page, the first window being larger than the second window; and playing, by the client, the video data of the second target video in the first window, and simultaneously playing the text data of the first target video in the second window.

The processor 151 is further configured to perform the following steps: after the simultaneously playing, by the client, the video data of the first target video and the text data of the second target video on a second live-broadcast page, sending, by the client, a second live-broadcast switching request to the server, the second live-broadcast switching request being used to request to switch the first target video to a third target video, and play the third target video in video mode and play the second target video in text mode; receiving, by the client, third live-broadcast data sent by the server in response to the second live-broadcast switching request, the third live-broadcast data including video data of the third target video and the text data of the second target video; and simultaneously playing, by the client, the video data of the third target video and the text data of the second target video on the second live-broadcast page.

The processor 151 is further configured to perform the following steps: playing, by the client, the video data of the first target video in a first window on the second live-broadcast page, and simultaneously playing the text data of the second target video in a second window on the second live-broadcast page, the first window being larger than the second window; and playing, by the client, the video data of the third target video in the first window, and simultaneously playing the text data of the second target video in the second window.

The processor 151 is further configured to perform the following steps: after the simultaneously playing, by the client, the video data of the first target video and the text data of the second target video on a second live-broadcast page, sending, by the client, a third live-broadcast switching request to the server, the third live-broadcast switching request being used to request to switch the second target video to a fourth target video, play the fourth target video in text mode, and play the first target video in video mode; receiving, by the client, fourth live-broadcast data sent by the server in response to the third live-broadcast switching request, the fourth live-broadcast data including the video data of the first target video and text data of the fourth target video; and simultaneously playing, by the client, the video data of the first target video and the text data of the fourth target video on the second live-broadcast page.

The processor 151 is further configured to perform the following steps: playing, by the client, the video data of the first target video in a first window on the second live-broadcast page, and simultaneously playing the text data of the second target video in a second window on the second live-broadcast page, the first window being larger than the second window; and playing, by the client, the video data of the first target video in the first window, and simultaneously playing the text data of the fourth target video in the second window.

In some embodiments, for a specific example in this embodiment, refer to the examples described in the foregoing embodiments, and details are not described herein again in this embodiment.

A person of ordinary skill in the art may understand that the structure shown in FIG. 15 is merely an example, and the terminal may be a terminal device such as a smartphone (for example, an Android mobile phone and an iOS mobile phone), a tablet computer, a palmtop computer, a MID, and a PAD. FIG. 15 is not intended to limit the structure of the foregoing electronic apparatus. For example, the terminal may further include more or less components (for example, a network interface and a display apparatus) than those shown in FIG. 15, or have configuration different with that shown in FIG. 15.

A person of ordinary skill in the art may understand that all or part of the steps of the methods in the embodiments may be implemented by a program by instructing hardware relevant to a terminal device. The program may be stored in a computer readable storage medium, and the storage medium may be a flash drive, a read-only memory (ROM), a random access memory (RAM), a magnetic disk, an optical disk, and so on.

An embodiment of the present disclosure further provides a storage medium. In some embodiments, in this embodiment, the foregoing storage medium may store program code, and the program code is used to perform the steps of the video playing method provided in the method embodiments.

In some embodiments, in this embodiment, the storage medium may be located in any computer terminal in a computer terminal cluster in a computer network, or in any mobile terminal in a mobile terminal cluster.

In some embodiments, in this embodiment, the storage medium is configured to store the program code used for executing the following steps: sending, by a client, first indication information to a server, the first indication information being used to instruct to play, in video mode, a first target video to be live broadcast, and instruct to play, in text mode, a second target video to be live broadcast; receiving, by the client, first live-broadcast data sent by the server, the first live-broadcast data including video data of the first target video and text data of the second target video; and simultaneously playing, by the client, the video data of the first target video and the text data of the second target video on a second live-broadcast page.

In some embodiments, the storage medium is further configured to store program code used to execute the following steps: before the sending, by a client, first indication information to a server, entering, by the client, a first live-broadcast page, the first live-broadcast page being used to live broadcast the first target video; and receiving, by the client, a viewing instruction, the viewing instruction being used to: request to simultaneously live broadcast the first target video and the second target video, and instruct to play the first target video in video mode and play the second target video in text mode; and sending, by the client, the first indication information corresponding to the viewing instruction to the server.

In some embodiments, the storage medium is further configured to store program code used to execute the following steps: after the sending, by a client, first indication information to a server, and before the receiving first live-broadcast data sent by the server, entering, by the client, the second live-broadcast page, the second live-broadcast page being used to simultaneously live broadcast the first target video and the second target video; and sending, by the client, a page playing request to the server; and receiving, by the client, the first live-broadcast data sent by the server in response to the page playing request.

In some embodiments, the storage medium is further configured to store program code used to execute the following steps: after the simultaneously playing, by the client, the video data of the first target video and the text data of the second target video on a second live-broadcast page, sending, by the client, a first live-broadcast switching request to the server, the first live-broadcast switching request being used to request to play the first target video in text mode and play the second target video in video mode; receiving, by the client, second live-broadcast data sent by the server in response to the first live-broadcast switching request, the second live-broadcast data including text data of the first target video and video data of the second target video; and simultaneously playing, by the client, the text data of the first target video and the video data of the second target video on the second live-broadcast page.

In some embodiments, the storage medium is further configured to store program code used to execute the following steps: playing, by the client, the video data of the first target video in a first window on the second live-broadcast page, and simultaneously playing the text data of the second target video in a second window on the second live-broadcast page, the first window being larger than the second window; and playing, by the client, the video data of the second target video in the first window, and simultaneously playing the text data of the first target video in the second window.

In some embodiments, the storage medium is further configured to store program code used to execute the following steps: after the simultaneously playing, by the client, the video data of the first target video and the text data of the second target video on a second live-broadcast page, sending, by the client, a second live-broadcast switching request to the server, the second live-broadcast switching request being used to request to switch the first target video to a third target video, and play the third target video in video mode and play the second target video in text mode; receiving, by the client, third live-broadcast data sent by the server in response to the second live-broadcast switching request, the third live-broadcast data including video data of the third target video and the text data of the second target video; and simultaneously playing, by the client, the video data of the third target video and the text data of the second target video on the second live-broadcast page.

In some embodiments, the storage medium is further configured to store program code used to execute the following steps: playing, by the client, the video data of the first target video in a first window on the second live-broadcast page, and simultaneously playing the text data of the second target video in a second window on the second live-broadcast page, the first window being larger than the second window; and playing, by the client, the video data of the third target video in the first window, and simultaneously playing the text data of the second target video in the second window.

In some embodiments, the storage medium is further configured to store program code used to execute the following steps: after the simultaneously playing, by the client, the video data of the first target video and the text data of the second target video on a second live-broadcast page, sending, by the client, a third live-broadcast switching request to the server, the third live-broadcast switching request being used to request to switch the second target video to a fourth target video, play the fourth target video in text mode, and play the first target video in video mode; receiving, by the client, fourth live-broadcast data sent by the server in response to the third live-broadcast switching request, the fourth live-broadcast data including the video data of the first target video and text data of the fourth target video; and simultaneously playing, by the client, the video data of the first target video and the text data of the fourth target video on the second live-broadcast page.

In some embodiments, the storage medium is further configured to store program code used to execute the following steps: playing, by the client, the video data of the first target video in a first window on the second live-broadcast page, and simultaneously playing the text data of the second target video in a second window on the second live-broadcast page, the first window being larger than the second window; and playing, by the client, the video data of the first target video in the first window, and simultaneously playing the text data of the fourth target video in the second window.

In some embodiments, for a specific example in this embodiment, refer to the examples described in the foregoing embodiments, and details are not described herein again in this embodiment.

In some embodiments, in this embodiment, the foregoing storage medium includes, but is not limited to: any medium that can store program code, such as a USB flash drive, a read-only memory (ROM), a random access memory (RAM), a removable hard disk, a magnetic disk, or an optical disc.

The video playing method and apparatus and the storage medium in the present disclosure are described above as examples with reference to the accompanying drawings. However, a person skilled in the art should understand that, for the video playing method and apparatus and the storage medium provided in the present disclosure, various improvements can further be made without departing from the basis of the content of the present disclosure. Therefore, the protection scope of the present disclosure should be subject to the content of the appended claims.

The sequence numbers of the foregoing embodiments of the present disclosure are merely for illustrative purposes, and are not intended to indicate priorities of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the present disclosure.

In the foregoing embodiments of the present disclosure, the description of each embodiment has respective focuses, and for the part that is not detailed in an embodiment, refer to the relevant description of other embodiments.

In the several embodiments provided in this application, it should be understood that the disclosed client may be implemented in other manners. For example, the described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary implementations of the present disclosure. It should be noted that a person of ordinary skill in the art may make several improvements or polishing without departing from the principle of the present disclosure, and the improvements or polishing shall fall within the protection scope of the present disclosure.

INDUSTRIAL APPLICABILITY

A client sends first indication information to a server, the first indication information being used to instruct to play, in video mode, a first target video to be live broadcast, and instruct to play, in text mode, a second target video to be live broadcast; the client receives first live-broadcast data sent by the server, the first live-broadcast data including video data of the first target video and text data of the second target video; and the client simultaneously plays the video data of the first target video and the text data of the second target video on a second live-broadcast page. The first indication information is sent to the server by using the client, the video data of the first target video and the text data of the second target video that are sent by the server according to the indication information are played on the second live-broadcast page of the client, so that the first target video and the second target video are simultaneously played, a technical effect that a function of playing live-broadcast videos on a same live-broadcast page is enriched is achieved, and a problem in the related technology that the function of playing live-broadcast videos on a same live-broadcast page is monotonous is further resolved.

What is claimed is:

1. A video playing method performed at a client having one or more processors and memory storing a plurality of programs to be executed by the one or more processors, the method comprising:
   sending, by a user at the client, information about a plurality of live-broadcast videos followed by the user to the server;
   receiving, by the client, an indication that live-broadcast following information corresponding to the live-broadcast videos is successfully stored from the server;
   sending, by the client, first indication information to a server, the first indication information being used to instruct the server to play a first target video to be live broadcast in video mode and a second target video to be live broadcast in text mode simultaneously, wherein the first target video and the second target video are both members of the live-broadcast videos followed by the user, and content of the first target video is different from content of the second target video;
   receiving, by the client, first live-broadcast data sent by the server, the first live-broadcast data comprising video data of the first target video and text data of the second target video; and
   simultaneously playing, by the client, the video data of the first target video and the text data of the second target video on a second live-broadcast page, further including:
      live-broadcasting the first target video in the video mode by displaying video images corresponding to the first target video on a first playing window and playing audio corresponding to the video images simultaneously; and
      live-broadcasting the second target video in the text mode by displaying video images corresponding to the second target video and text content of the second target video in a second playing window simultaneously without any audio content.

2. The method according to claim 1, further comprising:
   before sending, by the client, first indication information to the server:
   entering, by the client, a first live-broadcast page, the first live-broadcast page being used to live broadcast the first target video; and
   receiving, by the client, a viewing instruction, the viewing instruction being used to: request to simultaneously live broadcast the first target video and the second target video, and instruct the server to play the first target video in video mode and play the second target video in text mode; and
   sending, by the client, the first indication information corresponding to the viewing instruction to the server.

3. The method according to claim 1, further comprising:
   after sending, by the client, first indication information to the server, and before receiving first live-broadcast data sent by the server:
   entering, by the client, the second live-broadcast page, the second live-broadcast page being used to simultaneously live broadcast the first target video and the second target video;

sending, by the client, a page playing request to the server; and receiving, by the client, the first live-broadcast data sent by the server in response to the page playing request.

4. The method according to claim 1, further comprising:
after simultaneously playing, by the client, the video data of the first target video and the text data of the second target video on a second live-broadcast page:
sending, by the client, a first live-broadcast switching request to the server, the first live-broadcast switching request being used to request to play the first target video in text mode and play the second target video in video mode;
receiving, by the client, second live-broadcast data sent by the server in response to the first live-broadcast switching request, the second live-broadcast data comprising text data of the first target video and video data of the second target video; and
simultaneously playing, by the client, the text data of the first target video and the video data of the second target video on the second live-broadcast page.

5. The method according to claim 4, wherein the operation of simultaneously playing, by the client, the video data of the first target video and the text data of the second target video on a second live-broadcast page further comprises:
playing, by the client, the video data of the first target video in a first window on the second live-broadcast page, and simultaneously playing the text data of the second target video in a second window on the second live-broadcast page, the first window being larger than the second window; and
playing, by the client, the video data of the second target video in the first window, and simultaneously playing the text data of the first target video in the second window.

6. The method according to claim 1, further comprising:
after simultaneously playing, by the client, the video data of the first target video and the text data of the second target video on a second live-broadcast page:
sending, by the client, a second live-broadcast switching request to the server, the second live-broadcast switching request being used to request to switch the first target video to a third target video, and play the third target video in video mode and play the second target video in text mode;
receiving, by the client, third live-broadcast data sent by the server in response to the second live-broadcast switching request, the third live-broadcast data comprising video data of the third target video and the text data of the second target video; and
simultaneously playing, by the client, the video data of the third target video and the text data of the second target video on the second live-broadcast page.

7. The method according to claim 6, wherein the operation of simultaneously playing, by the client, the video data of the first target video and the text data of the second target video on a second live-broadcast page further comprises:
playing, by the client, the video data of the first target video in a first window on the second live-broadcast page;
simultaneously playing the text data of the second target video in a second window on the second live-broadcast page, the first window being larger than the second window; and playing, by the client, the video data of the third target video in the first window, and simultaneously playing the text data of the second target video in the second window.

8. The method according to claim 1, further comprising:
after simultaneously playing, by the client, the video data of the first target video and the text data of the second target video on a second live-broadcast page:
sending, by the client, a third live-broadcast switching request to the server, the third live-broadcast switching request being used to request to switch the second target video to a fourth target video, play the fourth target video in text mode, and play the first target video in video mode;
receiving, by the client, fourth live-broadcast data sent by the server in response to the third live-broadcast switching request, the fourth live-broadcast data comprising the video data of the first target video and text data of the fourth target video; and
simultaneously playing, by the client, the video data of the first target video and the text data of the fourth target video on the second live-broadcast page.

9. The method according to claim 8, wherein the operation of simultaneously playing, by the client, the video data of the first target video and the text data of the second target video on a second live-broadcast page comprises:
playing, by the client, the video data of the first target video in a first window on the second live-broadcast page;
simultaneously playing the text data of the second target video in a second window on the second live-broadcast page, the first window being larger than the second window; and
playing, by the client, the video data of the first target video in the first window, and simultaneously playing the text data of the fourth target video in the second window.

10. The method according to claim 1, wherein the first indication information is further used to instruct to: play the first target video in the first window, and play the second target video in the second window, the first window being larger than the second window.

11. The method according to claim 1, wherein the first indication information is further used to instruct to play audio of a target video in the first window, and turn off audio of a target video played in the second window, the first window being larger than the second window.

12. A client device, comprising:
one or more processors;
memory coupled to the one or more processors; and
a plurality of computer-readable instructions that, when executed by the one or more processors, cause the client device to perform the following operations:
sending, by a user at the client, information about a plurality of live-broadcast videos followed by the user to the server;
receiving, by a client, an indication that live-broadcast following information corresponding to the live-broadcast videos is successfully stored from the server;
sending first indication information to a server, the first indication information being used to instruct the server to play a first target video to be live broadcast in video mode and a second target video to be live broadcast in text mode simultaneously, wherein the first target video and the second target video are both members of the live-broadcast videos followed by the user, and content of the first target video is different from content of the second target video;

receiving first live-broadcast data sent by the server, the first live-broadcast data comprising video data of the first target video and text data of the second target video; and simultaneously playing the video data of the first target video and the text data of the second target video on a second live-broadcast page, further including:

live-broadcasting the first target video in the video mode by displaying video images corresponding to the first target video on a first playing window and playing audio corresponding to the video images simultaneously; and live-broadcasting the second target video in the text mode by displaying video images corresponding to the second target video and text content of the second target video in a second playing window simultaneously without any audio content.

13. The client device according to claim 12, wherein the operations further comprise:

before sending first indication information to the server:

entering a first live-broadcast page, the first live-broadcast page being used to live broadcast the first target video; and receiving a viewing instruction, the viewing instruction being used to: request to simultaneously live broadcast the first target video and the second target video, and instruct the server to play the first target video in video mode and play the second target video in text mode; and sending the first indication information corresponding to the viewing instruction to the server.

14. The client device according to claim 12, wherein the operations further comprise:

after sending first indication information to the server, and before receiving first live-broadcast data sent by the server:

entering the second live-broadcast page, the second live-broadcast page being used to simultaneously live broadcast the first target video and the second target video;

sending a page playing request to the server; and receiving the first live-broadcast data sent by the server in response to the page playing request.

15. The client device according to claim 12, wherein the operations further comprise:

after simultaneously playing the video data of the first target video and the text data of the second target video on a second live-broadcast page:

sending a first live-broadcast switching request to the server, the first live-broadcast switching request being used to request to play the first target video in text mode and play the second target video in video mode;

receiving second live-broadcast data sent by the server in response to the first live-broadcast switching request, the second live-broadcast data comprising text data of the first target video and video data of the second target video; and simultaneously playing the text data of the first target video and the video data of the second target video on the second live-broadcast page.

16. The client device according to claim 12, wherein the operations further comprise:

after simultaneously playing the video data of the first target video and the text data of the second target video on a second live-broadcast page:

sending a second live-broadcast switching request to the server, the second live-broadcast switching request being used to request to switch the first target video to a third target video, and play the third target video in video mode and play the second target video in text mode;

receiving third live-broadcast data sent by the server in response to the second live-broadcast switching request, the third live-broadcast data comprising video data of the third target video and the text data of the second target video; and simultaneously playing the video data of the third target video and the text data of the second target video on the second live-broadcast page.

17. The client device according to claim 12, wherein the operations further comprise:

after simultaneously playing the video data of the first target video and the text data of the second target video on a second live-broadcast page:

sending a third live-broadcast switching request to the server, the third live-broadcast switching request being used to request to switch the second target video to a fourth target video, play the fourth target video in text mode, and play the first target video in video mode;

receiving fourth live-broadcast data sent by the server in response to the third live-broadcast switching request, the fourth live-broadcast data comprising the video data of the first target video and text data of the fourth target video; and simultaneously playing the video data of the first target video and the text data of the fourth target video on the second live-broadcast page.

18. The client device according to claim 12, wherein the first indication information is further used to instruct to: play the first target video in the first window, and play the second target video in the second window, the first window being larger than the second window.

19. The client device according to claim 12, wherein the first indication information is further used to instruct to play audio of a target video in the first window, and turn off audio of a target video played in the second window, the first window being larger than the second window.

20. A non-transitory computer readable storage medium storing a plurality of instructions in connection with a client device having one or more processors, wherein the plurality of instructions, when executed by the one or more processors, cause the client device to perform a plurality of operations including:

sending, by a user at the client, information about a plurality of live-broadcast videos followed by the user to the server;

receiving, by the client, an indication that live-broadcast following information corresponding to the live-broadcast videos is successfully stored from the server;

sending first indication information to a server, the first indication information being used to instruct the server to play a first target video to be live broadcast in video mode and a second target video to be live broadcast in text mode simultaneously, wherein the first target video and the second target video are both members of the live-broadcast videos followed by the user, and content of the first target video is different from content of the second target video;

receiving first live-broadcast data sent by the server, the first live-broadcast data comprising video data of the first target video and text data of the second target video; and simultaneously playing the video data of the first target video and the text data of the second target video on a second live-broadcast page, further including:
 live-broadcasting the first target video in the video mode by displaying video images corresponding to the first target video on a first playing window and playing audio corresponding to the video images simultaneously; and
 live-broadcasting the second target video in the text mode by displaying video images corresponding to the second target video and text content of the second target video in a second playing window simultaneously without any audio content.

\* \* \* \* \*